United States Patent [19]
Miyashita

[11] Patent Number: 5,745,172
[45] Date of Patent: Apr. 28, 1998

[54] NOISE ELIMINATION CIRCUIT IN NEGATIVE IMAGE PICKUP APPARATUS

[75] Inventor: Mamoru Miyashita, Asaka, Japan

[73] Assignee: Fuji Photo Film Co., Ltd., Kanagawa, Japan

[21] Appl. No.: 426,870

[22] Filed: Apr. 24, 1995

[30] Foreign Application Priority Data

Apr. 25, 1994 [JP] Japan ................. 6-086627

[51] Int. Cl.$^6$ .................. H04N 5/217; H04N 5/208
[52] U.S. Cl. ................. 348/241; 348/96; 348/674
[58] Field of Search ................. 348/241, 674, 348/676, 677, 675, 96; 358/506, 455, 456; H04N 5/217, 5/208

[56] References Cited

U.S. PATENT DOCUMENTS

| | | | |
|---|---|---|---|
| 4,418,358 | 11/1983 | Poetsch et al. | 358/506 |
| 4,489,349 | 12/1984 | Okada | 348/674 |
| 4,982,294 | 1/1991 | Morten et al. | 358/465 |

FOREIGN PATENT DOCUMENTS 2-35507  8/1990  Japan .............. H04N 5/208

2035507  8/1990  Japan .............. H04N 5/208

OTHER PUBLICATIONS

English Translation Abstract of the Fujiki et al. patent.

*Primary Examiner*—Andrew Faile
*Assistant Examiner*—Andrew B. Christensen

[57] ABSTRACT

A luminance signal obtained by negative-positive inverting and gamma-correcting a signal indicating an image on a negative film and a contour correction signal $Y_{ap}$ generated from the luminance signal Y are input, and a signal $Y_{ap1}$ and a signal $Y_{ap2}$ are obtained by an adder, a subtractor and an adder in accordance with following equations:

$$Y_{ap1}=Y_{ap}-kY, \quad Y_{ap2}=Y_{ap}+kY,$$

where K is a damping coefficient.

Next, a slice circuit picks out signals having a higher level than the maximum level of the noise element, from the signal $Y_{ap1}$ generated as mentioned above and another slice circuit picks out signals having a lower level than the minimum level of the noise element, from the signal $Y_{ap2}$. An adder adds up these picked-out signals to be used as the noise free contour correction signal.

8 Claims, 7 Drawing Sheets

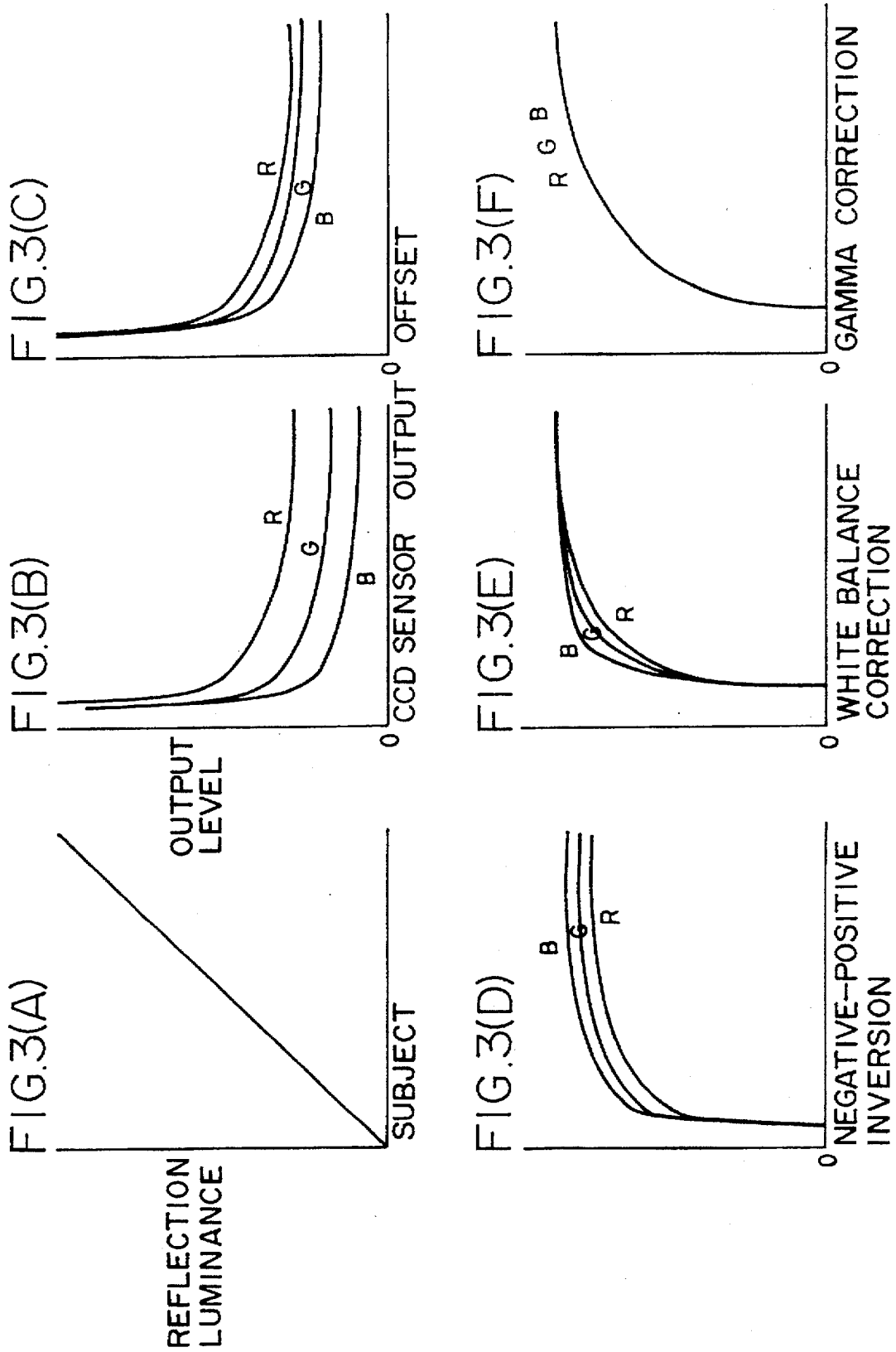

BEFORE Y GAMMA

AFTER Y GAMMA

BEFORE Y GAMMA

AFTER Y GAMMA

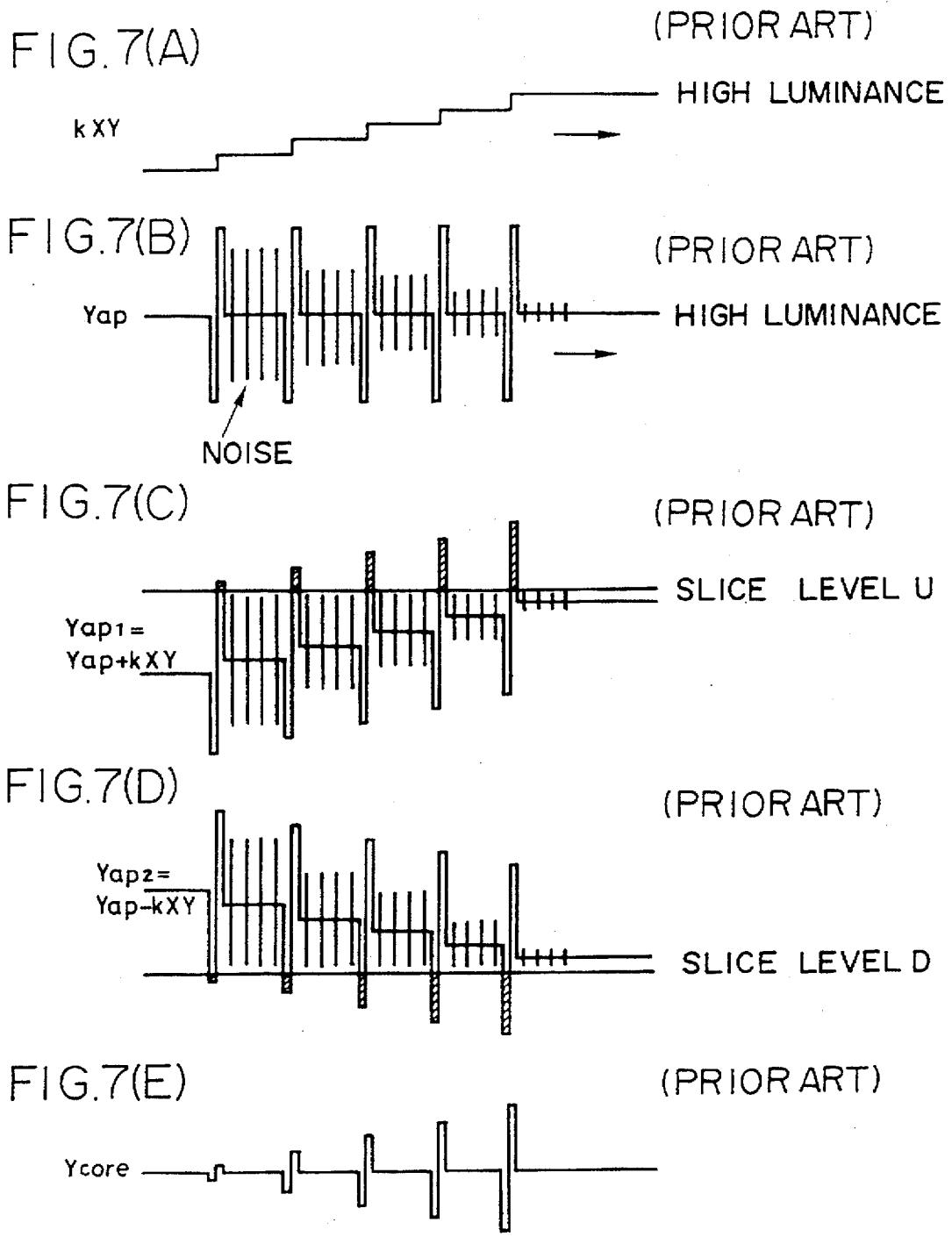

NOISE ELIMINATION CIRCUIT IN NEGATIVE IMAGE PICKUP APPARATUS

BACKGROUND OF THE INVENTION

1. Field of the Invention

The present invention relates to a noise elimination circuit and more particularly to a noise elimination circuit in a negative image pickup apparatus, which eliminates noise in a contour correction signal generated from a luminance signal that is obtained by picking up a negative film.

2. Description of the Related Art

Generally, when the television camera picks up a gray scale for $\gamma=0.45$ adjustment, a gradation of a luminance signal is a curve of $\gamma=2.2$ as shown in FIG. 6 (A). Accordingly, when the gamma-correction of $\gamma=0.45$ is performed for the luminance signal, the gradation is linear as shown in FIG. 6 (B). That is, because a gamma value of a TV Braun tube is approximately 2.2, the gamma correction circuit carries out the gamma correction of $\gamma=0.45$ and the gamma value of the entire system is set at 1, so that an original image can be correctly reproduced.

However, white noise is included in an image signal picked out from a television camera, and when the gamma correction of $\gamma=0.45$ is performed, the noise in a part of a low luminance increases as shown in FIG. 6 (B). Therefore, when a contour correction signal $Y_{ap}$ is generated from the luminance signal after the gamma correction, the noise, of which level differs in accordance with the level of the luminance signal, is included in the contour correction signal $Y_{ap}$ as shown in FIG. 7 (B).

Conventionally, as a noise elimination circuit for eliminating the noise in the contour correction signal $Y_{ap}$ shown in FIG. 7 (B), there is one which performs the following processing (Japan Patent Application No. 2-35507).

That is, a signal kY (FIG. 7 (A)) which is obtained by attenuating the luminance signal Y is added to the contour correction signal $Y_{ap}$ (FIG. 7 (B)), and the signal kY is subtracted from the contour correction signal $Y_{ap}$, so that a signal of which a waveform as shown in FIGS. 7 (C) and (D) is obtained. Then, a signal, having a higher level than the maximum level of the noise, is eliminated from a signal of FIG. 7 (C) with a slice level U, and a signal having a lower level than the minimum value of the noise, is eliminated from a signal of FIG. (D) with a slice level D. The signals after the elimination are added up and a new contour correction signal $Y_{core}$ which has no noise element as shown in FIG. 7 (E) is obtained.

However, in the case that a negative film is picked up, a carve of the gamma correction for transforming the gamma of the negative film into the gamma of the ordinary video signal (generally, $\gamma=0.45$) is more than $\gamma=1$ because of the characteristics of the negative film's gamma. Accordingly, in the luminance signal obtained by negative-positive inverting and gamma-correcting a signal indicating an image on the negative film, the noise in a part of a high luminance increases, and when the contour correction of the luminance signal is carried out by the ordinary contour correction signal, there is a problem in that the noise is emphasized and S/N of an output image deteriorates.

Furthermore, when the conventional noise elimination circuit eliminates the noise in the contour correction signal, it suppress the noise especially in the part of low luminance, so there is a problem in that an effective contour correction signal in the part of low luminance is also eliminated.

SUMMARY OF THE INVENTION

The present invention has been developed in view of the above-described circumstances, and has its aim the provision of a noise elimination circuit in a negative image pickup apparatus, which can effectively reduce a noise in a contour correction signal generated from a luminance signal that is obtained by picking up a negative film, and which can prevent the deterioration of S/N of a contour-corrected output image.

To achieve the above-mentioned object, a noise elimination circuit in a negative image pickup apparatus, which receives a luminance signal obtained by negative-positive inverting and gamma-correcting a signal indicating an image on a negative film and a contour correction signal generated from the luminance signal so as to eliminate noise included in the contour correction signal, includes a device for obtaining a signal $Y_{ap1}$ and a signal $Y_{ap2}$ in accordance with following equations when the luminance signal is Y and the contour correction signal is $Y_{ap}$:

$$Y_{ap1}=Y_{ap}-kY$$

$$Y_{ap2}=Y_{ap}+kY$$

, where k is an attenuating coefficient.

A first slice circuit for picking out a signal, having a higher level than the maximum level of a noise element in the signal $Y_{ap1}$, a second slice circuit for picking out a signal having a lower level than a minimum level of a noise element in the signal $Y_{ap2}$, and an adding unit which adds up signals picked out by the first and second circuits.

The present invention has been developed in view of the fact that in the luminance signal obtained by negative-positive inverting and gamma-correcting the signal indicating the image on the negative film, the higher the luminance level becomes, the larger its noise amplitude becomes. As a result, the noise amplitude of the contour correction signal generated from the luminance signal also becomes larger, and the present invention aims to suppress the noise especially in high luminance signal part.

That is, when the luminance signal after the gamma correction is Y and the contour correction signal generated from the luminance signal Y is $Y_{ap}$, the signal $Y_{ap1}$ and the signal $Y_{ap2}$ are obtained with following equations:

$$Y_{ap1}=Y_{ap}-kY$$

$$Y_{ap2}=Y_{ap}+kY$$

, where k is an attenuating coefficient.

and the signal, having a higher level than the maximum level of a noise element in the signal $Y_{ap1}$, and the signal level having a lower than the minimum level of a noise element in the signal $Y_{ap2}$ are picked out. Then, the picked-out signals are added up and the new contour correction signal, of which noise element has been eliminated, is generated.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures and wherein:

FIGS. 3 (A), 3 (B), 3 (C), 3 (D), 3 (E), and 3 (F) are graphs illustrating an gradation of output signals of each part in FIG. 1;

DESCRIPTION OF THE PREFERRED EMBODIMENT

Detailed description will hereunder be given of the preferred embodiment of a noise elimination circuit in a negative image pickup apparatus according to the present invention with reference to the accompanying drawings.

Figure 1:
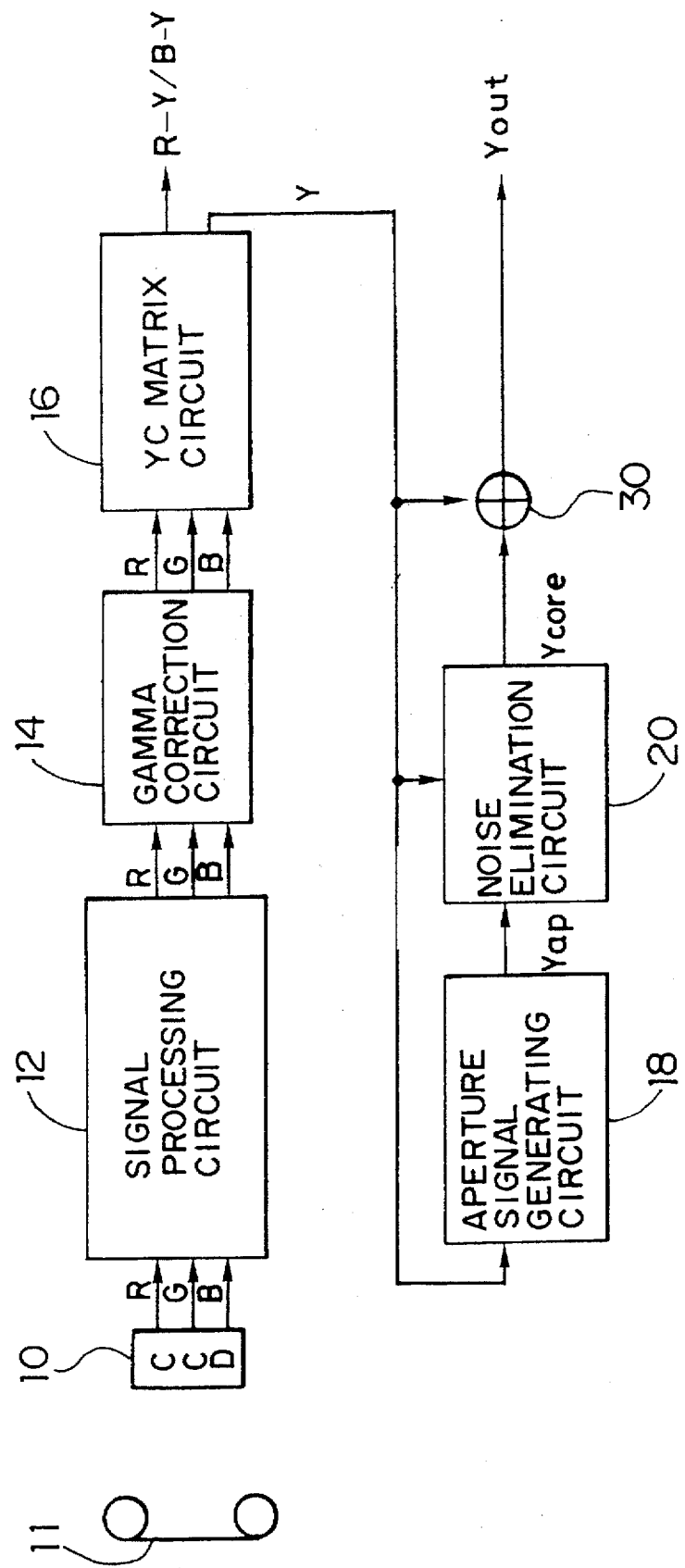
FIG. 1 is a block diagram illustrating one embodiment of a negative image pickup apparatus, wherein a noise elimination circuit is used, according to the present invention.

FIG. 1 is a block diagram illustrating one embodiment of a negative image pickup apparatus wherein a noise elimination circuit is used according to the present invention. The negative image pickup apparatus mainly comprises a CCD image sensor 10, a signal processing circuit 12, a gamma correction circuit 14, a matrix circuit 16, an aperture signal generating circuit 18, a noise elimination circuit 20, an adder 30, and so forth.

The CCD line sensor 10 picks up an image on a developed negative film 11, and outputs R, G and B signals which indicate a film image of one frame, to a signal processing circuit 12.

Here, when the CCD image sensor 10 picks up the image of the subject of which gradation linearly increases as shown in FIG. 3 (A) on a negative film and outputs R, G and B signals, to a plot of which is shown in FIG. 3 (A) due to the characteristic of the negative film's gamma, to the signal processing circuit 12.

The circuit 12 carries out the signal-processing such as offset, white-balance, negative-positive inversion, etc.

First, the circuit 12 adds appropriate offset values to the input R, G and B signals respectively so as to equalize their peak values (a black part on a positive image). Then, the circuit 12 subtracts these offset R, G and B signals from a predetermined peak value, as a result, the negative-positive inversion is carried out. FIG. 3 (D) shows the curve of the negative-positive inverted R, G and B signals.

Next, the negative-positive inverted R, G and B signals are respectively multiplied by gain values suitable for the white-balance correction. That is, as shown in FIG. 3 (E), the other peak values (a white part on a positive image) of the R, G and B signals are equalized.

Figure 4A:
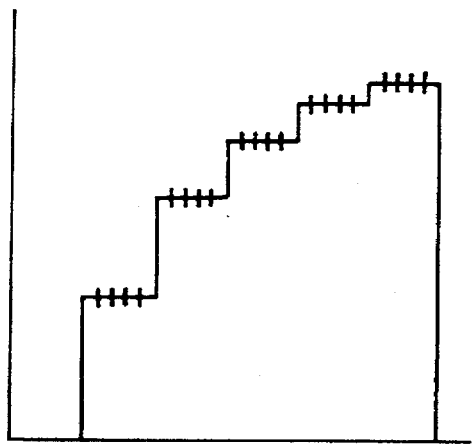
FIGS. 4 (A) and 4 (B) are graphs illustrating the gradation of a signal before and after gamma correction in a gamma correction circuit of FIG. 1.
Figure 4B:
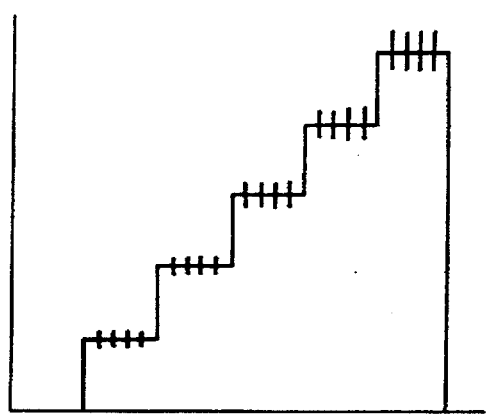

The gamma correction circuit 14 equalizes the half tone of the R, G and B signals by respectively gamma-correcting the R, G and B signals, which have been white-balanced, and is a gradation indicating a predetermined gamma ($\gamma$=0.45) (refer to FIG. 3 (F)). The gamma correction is performed in the circuit 14 with a gamma more than $\gamma$=1 due to the characteristics of the negative film. Accordingly, the gradation of an input signal of FIG. 4 (A) is corrected into a gradation as shown in FIG. 4 (B) within the circuit 14. That is, the signal of the low luminance side is compressed, the signal of the high luminance side is extended, and at the same time, the white noise in R, G, and B signals is compressed and extended.

The gamma-corrected R, G and B signals are input to the circuit 16 for matrix generating wherein the luminance signal Y and color difference signals R-Y/B-Y are generated from these input signals. The color difference signals R-Y/B-Y are output to an encoder, which is not shown in the drawing, and the luminance signal Y is output to the aperture signal generating circuit 18, the noise elimination circuit 20, and the adder 30.

The aperture signal generating circuit 18 generates an aperture signal $Y_{ap}$ (a contour correction signal) in accordance with a following equation in accordance with luminance signals $Y_1$, $Y_2$ and $Y_3$, which are input one by one:

$$Y_{ap}=Y_2-(Y_1+Y_3)\cdot\tfrac{1}{2} \tag{1}$$

Figure 2:
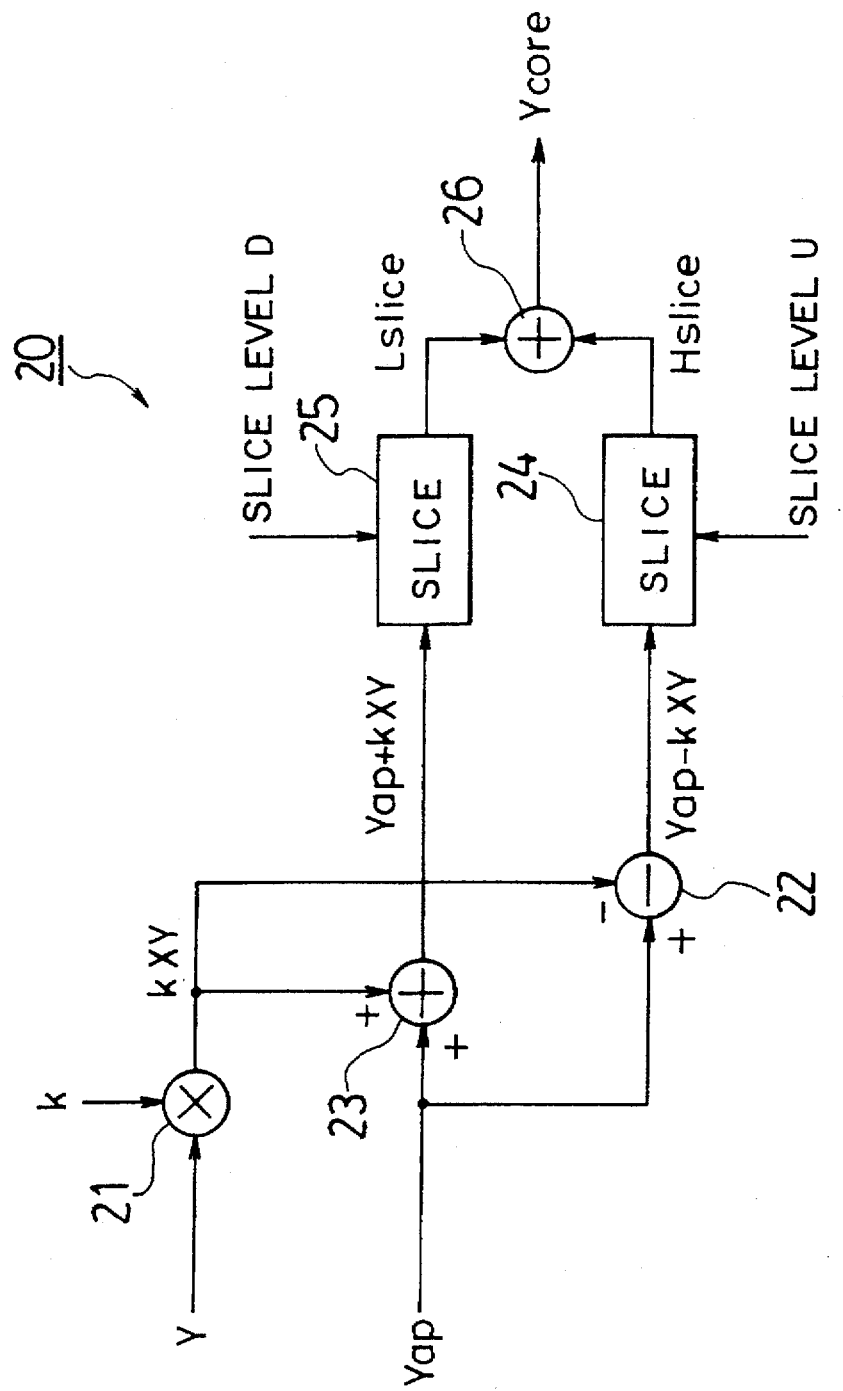
FIG. 2 is a block diagram illustrating details of the noise elimination circuit of FIG. 1.
Figure 5A:
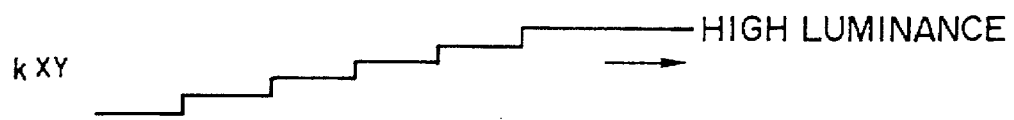
FIGS. 5 (A), 5 (B), 5 (C), 5 (D), and 5 (E) are waveform chart explaining a method of noise elimination according to the present invention.
Figure 5B:
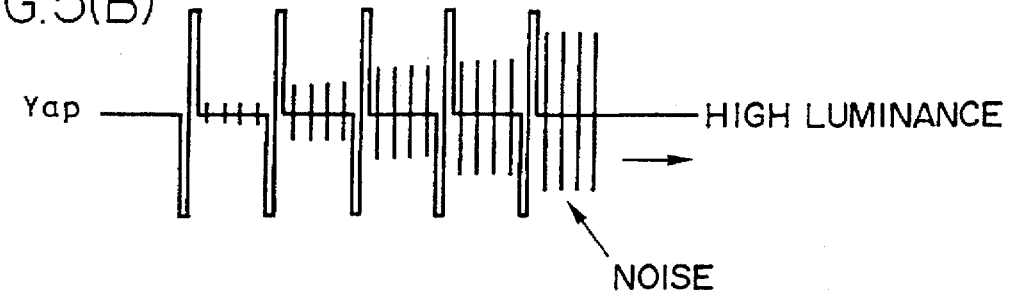
Figure 5C:
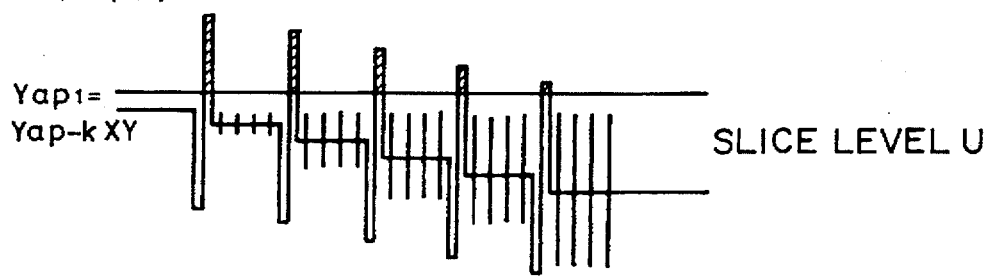
Figure 5D:
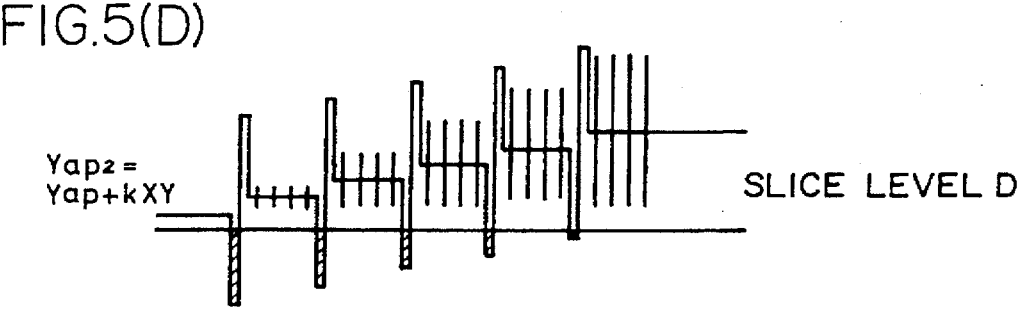
Figure 5E:
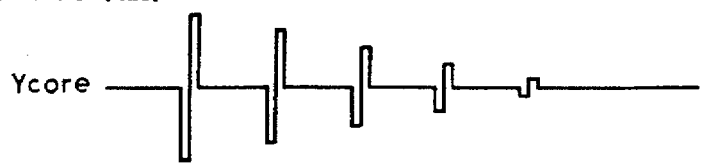
Figure 6A:
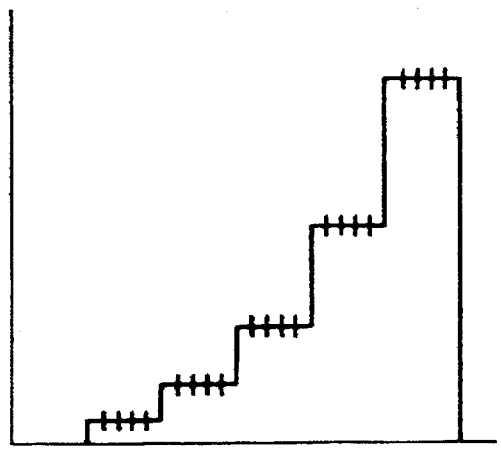
FIGS. 6 (A) and 6 (B) are graphs illustrating the gradation of a signal before and after gamma correction in a gamma correction circuit of the conventional television camera; and, FIGS. 7 (A), 7 (B), 7 (C), 7 (D), and 7 (E) are waveform charts explaining the conventional method of noise-reduction.
Figure 6B:
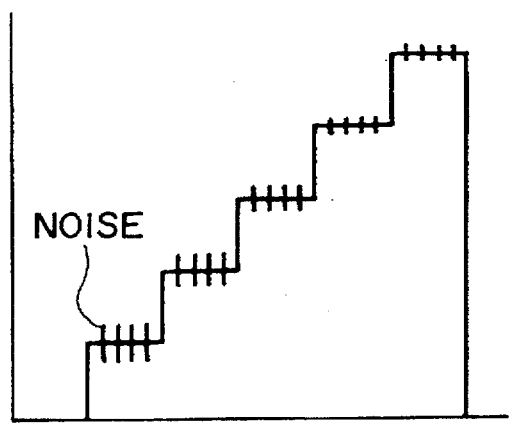

In the case when the luminance signals $Y_1$, $Y_2$ and $Y_3$ generate the aperture signal in a horizontal direction, the luminance signals $Y_2$ and $Y_3$ are signals which have proceeded $Y_1$, by one and two picture elements respectively. In the case when the aperture signals in a vertical direction are generated, the luminance signals $Y_2$ and $Y_3$ are signals which have proceeded $Y_1$, by one and two lines respectively. FIG. 5 (B) is a waveform chart illustrating the aperture signal $Y_{ap}$, which is produced as mentioned above. As shown in FIG. 5(A), as the luminance level becomes higher, an amplitude becomes larger. The noise elimination circuit 20 receives the aperture signal $Y_{ap}$ and eliminates the noise of the aperture signal $Y_{ap}$. The circuit 20 includes a multiplier 21, a subtractor 22, an adder 23 and 26, and slice circuits 24 and 25 as shown in FIG. 2.

The luminance signal Y from the matrix circuit 16 is input to the multiplier 21 to which an attenuating coefficient k is also input. The attenuating coefficient k is determined in such a manner that a gradient of the signal kY against the luminance level is almost the same as the gradient of an outline of the maximum level in the aperture signal $Y_{ap}$'s noise.

Then a signal kY is generated by multiplying the luminance signal Y by the attenuating coefficient k and is outputted to the subtractor 22 and the adder 23.

The subtractor 22 and the adder 23 also receive the aperture signal $Y_{ap}$ from the aperture signal generating circuit. The subtractor 22 subtracts the signal kY from the aperture signal $Y_{ap}$ to obtain a signal $Y_{ap1}$ in accordance with a following equation (refer to FIG. 5(C)):

$$Y_{ap1}=Y_{ap}-kY \tag{2}$$

The adder 23 adds the aperture signal $Y_{ap}$ to kY to obtain a signal $Y_{ap2}$ in accordance with a following equation (refer to FIG. 5 (D)):

$$Y_{ap2}=Y_{ap}+kY \tag{3}$$

As shown in FIGS. 5 (C) and 5 (D), the maximum level of the signal $Y_{ap1}$ is fixed regardless of the luminance level, and the minimum level of the signal $Y_{ap2}$ is also fixed regardless of the luminance level.

The signals $Y_{ap1}$ and $Y_{ap2}$ from the subtractor 22 and the adder 23 are respectively input to the slice circuits 24 and 25. In the slice circuit 24, a slice level U for picking out the signal having a higher level than the maximum level of the noise element included in the signal $Y_{ap1}$, is predetermined, and the slice circuit 24 picks out a signal $H_{slice}$, which is higher than the slice level U from the signal $Y_{ap1}$ and outputs the signal $H_{slice}$ to the adder 26. Similarly, in the slice circuit 25, the slice level D for picking out a signal, having a lower level than the minimum level of the noise element in the signal $Y_{ap2}$ as shown in FIG. 5 (D), is predetermined, and a signal $L_{slice}$ is picked out from the signal $Y_{ap2}$ and output to the adder 26.

The adder 26 adds up the signal $H_{slice}$ and the signal $L_{slice}$, and outputs a new aperture signal $Y_{core}$, whose noise has been eliminated, to the adder 30 of FIG. 1 as shown in FIG. 5 (E). The luminance signal Y is also input to the adder 30, and the adder 30 adds the aperture signal $Y_{core}$ to the luminance signal Y.

As has been described above, according to the noise elimination circuit in the negative image pickup apparatus of the present invention, the noise in the contour correction signal produced from the luminance signal, which is obtained by picking up the negative film, can be effectively eliminated, and the S/N of the contour-corrected image does not deteriorate.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A noise elimination circuit in a negative image pickup apparatus which receives a luminance signal obtained by negative-positive inverting and gamma-correcting a signal indicating an image on a negative film and a contour correction signal generated from said luminance signal and which eliminates a noise included in said contour correction signal, comprising:

means for generating a signal $Y_{ap1}$ and a signal $Y_{ap2}$ in accordance with a following equation when said luminance signal is Y and said contour correction signal is $Y_{ap}$:

$$Y_{ap1}=Y_{ap}-kY$$

$$Y_{ap2}=Y_{ap}+kY,$$

where k is an attenuating coefficient;

a first slice circuit which picks out signals having a higher level than a maximum level of a noise element in said signal $Y_{ap1}$;

a second slice circuit which picks out signals having a lower level than a minimum level of a noise element in said signal $Y_{ap2}$; and, an adder which adds up signals picked out by said first and second slice circuits.

2. The noise elimination circuit in the negative scanner as set forth in claim 1, wherein a gamma value of a curve in a gamma-correction for obtaining said luminance signal is more than 1.

3. The noise elimination circuit in the negative scanner as set forth in claim 2, wherein an outline of a plot of a signal ky which is obtained by multiplying said attenuating coefficient k by said luminance signal y versus luminance has the same inclination as that of an outline of a plot of a maximum value of a noise included in said contour correction signal $Y_{ap}$ versus luminance.

4. The noise elimination circuit in the negative scanner as set forth in claim 1, wherein a signal output from said adder serves as the contour correction signal.

5. A method for eliminating noise in a negative image pickup apparatus which receives a luminance signal obtained by negative-positive inverting and gamma-correcting a signal indicating an image on a negative film and a contour correction signal generated from said luminance signal, the method eliminating noise in said contour correction signal, comprising the steps of:

generating a signal $Y_{ap1}$ and a signal $Y_{ap2}$ in accordance with a following equation when said luminance signal is Y and said contour correction signal $Y_{ap}$:

$$Y_{ap1}=Y_{ap}-kY$$

$$Y_{ap2}=Y_{ap}+kY,$$

where k is an attenuating coefficient;

picking out first signals having a higher level than a maximum level of a noise element in said signal $Y_{ap}$;

picking out second signals having a lower level than a minimum level of a noise element in said signal $Y_{ap2}$; and, adding said first and second signals.

6. The method as set forth in claim 5, wherein a gamma value of a curve in a gamma-correction for obtaining said luminance signal is more than 1.

7. The method as set forth in claim 5, further including selecting said attenuating coefficient k so that an outline of a plot of a product of k and said luminance signal y versus luminance has the same inclination as that of an outline of a plot of maximum noise of said contour correction signal $Y_{ap}$ versus luminance.

8. The method as set forth in claim 5, further including delivering a signal from said adding as said contour correction signal.

* * * * *